(12) United States Patent
Jiang (10) Patent No.: US 11,272,393 B2
(45) Date of Patent: Mar. 8, 2022

(54) METHOD AND APPARATUS FOR SENDING BUFFER STATE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 212 days.

(21) Appl. No.: 16/660,422

(22) Filed: Oct. 22, 2019

(65) Prior Publication Data

US 2020/0053594 A1 Feb. 13, 2020

Related U.S. Application Data

(63) Continuation of application No. PCT/CN2017/082421, filed on Apr. 28, 2017.

(51) Int. Cl.
*H04W 28/02* (2009.01)
*H04W 72/08* (2009.01)
*H04W 72/10* (2009.01)
*H04W 76/27* (2018.01)
*H04W 76/11* (2018.01)
(Continued)

(52) U.S. Cl.
CPC ..... *H04W 28/0278* (2013.01); *H04W 72/087* (2013.01); *H04W 72/10* (2013.01); *H04W 76/27* (2018.02)

(58) Field of Classification Search
CPC ........... H04W 28/0278; H04W 28/065; H04W 28/10; H04W 76/27; H04W 76/28; H04W 52/0216; H04W 72/04; H04W 72/087; H04W 72/10; H04L 1/0001; H04L 47/10
See application file for complete search history.

(56) References Cited

U.S. PATENT DOCUMENTS 6,094,429 A * 7/2000 Blanchette ........... H04B 7/2643
370/347
10,148,405 B2 * 12/2018 Marinier ............... H04L 5/0053
(Continued)

FOREIGN PATENT DOCUMENTS

CN 101925128 A 12/2010
CN 101998621 A 3/2011
(Continued)

OTHER PUBLICATIONS

First office action of Chinese application No. 201780000280.8 dated Jun. 1, 2020.
(Continued)

*Primary Examiner* — Jenee Holland
(74) *Attorney, Agent, or Firm* — Syncoda LLC; Feng Ma (57) ABSTRACT

A method for sending buffer state includes: determining a logical channel of a user equipment (UE) for transmitting service data; acquiring a buffer state report trigger mode corresponding to the logical channel based on a trigger mode relationship table, the trigger mode relationship table comprising logical channels in the UE and buffer state report trigger modes corresponding to the logical channels; and sending the buffer state corresponding to the logical channel to an access network device based on the buffer state report trigger mode.

15 Claims, 6 Drawing Sheets

(51) Int. Cl.
*H04L 29/08* (2006.01)
*H04W 72/04* (2009.01)

(56) References Cited

U.S. PATENT DOCUMENTS

| | | | | |
|---|---|---|---|---|
| 2008/0084851 | A1* | 4/2008 | Kim | H04W 72/048 370/336 |
| 2009/0113086 | A1* | 4/2009 | Wu | H04W 72/1284 710/56 |
| 2009/0280798 | A1 | 11/2009 | Meylan et al. | |
| 2010/0322187 | A1* | 12/2010 | Tani | H04L 1/0017 370/331 |
| 2011/0013506 | A1* | 1/2011 | Ishii | H04W 72/1242 370/208 |
| 2011/0171967 | A1* | 7/2011 | Lee | H04W 72/0486 455/452.1 |
| 2011/0267959 | A1* | 11/2011 | Yi | H04W 28/0278 370/241 |
| 2012/0014281 | A1* | 1/2012 | Chun | H04W 72/087 370/252 |
| 2012/0069805 | A1* | 3/2012 | Feuersanger | H04W 72/0413 370/329 |
| 2013/0094455 | A1 | 4/2013 | Wu et al. | |
| 2013/0114445 | A1* | 5/2013 | Wen | H04L 5/0007 370/252 |
| 2014/0003320 | A1* | 1/2014 | Etemad | H04W 76/40 370/312 |
| 2014/0064219 | A1* | 3/2014 | Quan | H04W 72/1284 370/329 |
| 2015/0043547 | A1* | 2/2015 | Pelletier | H04W 28/0278 370/336 |
| 2015/0078286 | A1* | 3/2015 | Kim | H04W 48/00 370/329 |
| 2015/0092541 | A1 | 4/2015 | Yang et al. | |
| 2015/0098322 | A1* | 4/2015 | Chen | H04W 28/0252 370/230 |
| 2015/0230082 | A1* | 8/2015 | Li | H04W 28/0252 370/252 |
| 2016/0029245 | A1* | 1/2016 | Hong | H04W 28/0278 370/329 |
| 2016/0044678 | A1* | 2/2016 | Kwon | H04W 72/0453 370/329 |
| 2016/0066328 | A1* | 3/2016 | Hu | H04W 72/1242 370/329 |
| 2016/0227561 | A1 | 8/2016 | Susitaival et al. | |
| 2017/0245171 | A1* | 8/2017 | Jung | H04L 47/32 |
| 2017/0280486 | A1* | 9/2017 | Lee | H04W 72/02 |
| 2017/0290028 | A1* | 10/2017 | Lee | H04W 72/14 |
| 2017/0310433 | A1* | 10/2017 | Dinan | H04L 27/2613 |
| 2017/0310531 | A1* | 10/2017 | Dinan | H04L 27/32 |
| 2018/0034524 | A1* | 2/2018 | Pao | H04L 1/1825 |
| 2018/0206290 | A1* | 7/2018 | Dai | H04W 52/50 |
| 2018/0302918 | A1* | 10/2018 | Shaheen | H04W 28/0278 |
| 2018/0368167 | A1* | 12/2018 | Kim | H04W 28/0278 |
| 2019/0053215 | A1* | 2/2019 | Yu | H04W 76/14 |
| 2019/0090264 | A1* | 3/2019 | Xiao | H04W 28/0278 |
| 2019/0357237 | A1* | 11/2019 | Yu | H04W 72/14 |
| 2020/0037345 | A1* | 1/2020 | Ryoo | H04W 72/1284 |
| 2020/0288344 | A1* | 9/2020 | Zhang | H04W 4/40 |
| 2020/0382988 | A1* | 12/2020 | Zhao | H04W 28/0278 |

FOREIGN PATENT DOCUMENTS

| | | |
|---|---|---|
| CN | 102291200 A | 12/2011 |
| CN | 102291772 A | 12/2011 |
| CN | 102457895 A | 5/2012 |
| CN | 103313396 A | 9/2013 |
| WO | 2015020461 A1 | 2/2015 |
| WO | 2016175495 A1 | 11/2016 |
| WO | 2016182344 A1 | 11/2016 |

OTHER PUBLICATIONS

Extended European search report of counterpart EP application No. 17907789.6 dated Mar. 20, 2020.
Vivo, R2-1702515 Enhanced BSR in NR, 3GPP TSG-RAN WG2 Meeting #97bis, Mar. 25, 2017, paragraph 2.
3gpp:"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 VI4.2.1, Apr. 27, 2017 (Apr. 27, 2017), pp. 1-106, Section 5. 4. 5, 5.14.1. 4, 6.1.3.
International search report of PCT application No. PCT/CN2017/082421 dated Jan. 15, 2018.
Third office action of Chinese application No. 201780000280.8 dated Mar. 26, 2021.
Examination report of Indian application No. 201927043603 dated Mar. 17, 2021.

* cited by examiner

METHOD AND APPARATUS FOR SENDING BUFFER STATE

CROSS-REFERENCE TO RELATED APPLICATION

This application is a continuation of International Application No. PCT/CN2017/082421 filed on Apr. 28, 2017, the disclosure of which is hereby incorporated by reference in its entirety.

BACKGROUND

In long-term evolution (LTE), a base station configures a logical channel for transmitting service data in a user equipment (UE). In the UE, each logical channel corresponds to a buffer space, and the UE acquires buffer state of the logical channel. The buffer state is status of the buffer space corresponding to the logical channel. The buffer state is sent to the base station, such that the base station allocates a network resource for transmitting service data for the UE based on the buffer state.

SUMMARY

The present disclosure relates generally to the technical field of communications, and more specifically to a method and apparatus for sending buffer state.

Various embodiments of the present disclosure provide a method and apparatus for sending buffer state. The technical solutions are as follows.

In a first aspect, a method for sending buffer state is provided. The method including:
determining a logical channel of a user equipment (UE) for transmitting service data;
acquiring a buffer state report trigger mode corresponding to the logical channel based on a trigger mode relationship table, the trigger mode relationship table comprising logical channels in the UE and buffer state report trigger modes corresponding to the logical channels; and
sending the buffer state corresponding to the logical channel to an access network device based on the buffer state report trigger mode.

In some embodiments, further including:
receiving a buffer state report trigger mode corresponding to a logical channel group and channel identifiers of each logical channel in the logical channel group sent by the access network device, the logical channel group comprising at least one logical channel in the UE; and
storing the channel identifiers of the each logical channel in the logical channel group and the buffer state report trigger mode corresponding to the logical channel group to the trigger mode relationship table;
wherein the buffer state report trigger mode corresponding to the logical channel group in which the logical channel is included is acquired by:
acquiring the buffer state report trigger mode corresponding to the logical channel from the trigger mode relationship table based on the channel identifier of the logical channel.

In some embodiments, wherein the receiving a buffer state report trigger mode corresponding to a logical channel group sent by the access network device comprises:
receiving a Radio Resource Control (RRC) message sent by the access network device, the RRC message comprising the channel identifiers of the each logical channel in the logical channel group and the buffer state report trigger mode corresponding to the logical channel group.

In some embodiments, wherein the sending buffer state corresponding to the logical channel to an access network device based on the buffer state report trigger mode comprises:
if the buffer state report trigger mode is a mode that the buffer state report is triggered when new data arrives, sending the buffer state of the logical channel to the access network device when the UE buffers service data to a buffer space corresponding to the logical channel;
if the buffer state report trigger mode is a mode that the buffer state report is triggered when a buffer data amount reaches a predetermined threshold, sending the buffer state of the logical channel to the access network device when a service data amount buffered in a buffer space corresponding to the logical channel reaches a predetermined threshold; or
if the buffer state report trigger mode is a mode that the buffer state report is triggered when a high priority is assigned, acquiring service priorities of various services to be sent by the UE, and sending the buffer state of the logical channel to the access network device if a service priority corresponding to the service data is the highest one of the acquired service priorities of the various services.

In a second aspect, a method for sending buffer state is provided. The method including:
determining a buffer state report trigger mode corresponding to a logical channel group, the logical channel group comprising at least one logical channel of a user equipment (UE); and
sending a radio resource control (RRC) message to the UE, the RRC message comprising a buffer state report trigger mode corresponding to the logical channel group and channel identifiers of each logical channel in the logical channel group, and the RRC message being configured to send, by the UE, the buffer state of the logical channel of the UE.

In a third aspect, an apparatus for sending buffer state is provided. The apparatus including:
a determining module, configured to determine a logical channel for transmitting service data in a user equipment (UE);
an acquiring module, configured to acquire a buffer state report trigger mode corresponding to the logical channel based on a trigger mode relationship table, the trigger mode relationship table comprising logical channels in the UE and buffer state report trigger modes corresponding to the logical channels; and
a sending module, configured to send the buffer state corresponding to the logical channel to an access network device based on the buffer state report trigger mode.

In some embodiments, further including:
a receiving module, configured to receive a buffer state report trigger mode corresponding to a logical channel group and channel identifiers of each logical channel in the logical channel group sent by the access network device, the logical channel group comprising at least one logical channel in the UE; and
a storing module, configured to store the channel identifiers of the each logical channel in the logical channel group and the buffer state report trigger mode corresponding to the logical channel group to the trigger mode relationship table;
wherein the acquiring module is further configured to acquire the buffer state report trigger mode corresponding to the logical channel from the trigger mode relationship table based on the channel identifier of the logical channel.

In some embodiments, wherein the receiving module is configured to receive an RRC message sent by the access network device, the RRC message comprising the channel identifiers of the each logical channel in the logical channel group and the buffer state report trigger mode corresponding to the logical channel group.

In some embodiments, wherein the sending module is configured to:

if the buffer state report trigger mode is a mode that the buffer state report is triggered when new data arrives, sending the buffer state of the logical channel to the access network device when the UE buffers service data to a buffer space corresponding to the logical channel;

if the buffer state report trigger mode is a mode that the buffer state report is triggered when a buffer data amount reaches a predetermined threshold, sending the buffer state of the logical channel to the access network device when a service data amount buffered in a buffer space corresponding to the logical channel reaches a predetermined threshold; or if the buffer state report trigger mode is a mode that the buffer state report is triggered when a high priority is assigned, acquiring service priorities of various services to be sent by the UE, and sending the buffer state of the logical channel to the access network device if a service priority corresponding to the service data is the highest one of the acquired service priorities of the various services.

In a fourth aspect, an apparatus for sending buffer state is provided. The apparatus including:

a configuring module, configured to determine a buffer state report trigger mode corresponding to a logical channel group, the logical channel group comprising at least one logical channel of a user equipment (UE); and a sending module, configured to send a radio resource control (RRC) message to the UE, the RRC message comprising a buffer state report trigger mode corresponding to the logical channel group and channel identifiers of each logical channel in the logical channel group, and the RRC message is configured to send, by the UE, the buffer state of the logical channel of the UE.

In a fifth aspect, an apparatus for sending buffer state is provided. The apparatus including:

a processor; and a memory for storing instructions executable by the processor;

wherein the processor is configured to perform following instructions:

determine a logical channel for transmitting service data in a user equipment (UE);

acquire a buffer state report trigger mode corresponding to the logical channel based on a trigger mode relationship table, the trigger mode relationship table comprising logical channels in the UE and buffer state report trigger modes corresponding to the logical channels; and send the buffer state corresponding to the logical channel to an access network device based on the buffer state report trigger mode.

In some embodiments, wherein the processor is further configured to perform following instructions:

receive a buffer state report trigger mode corresponding to a logical channel group and channel identifiers of each logical channel in the logical channel group sent by the access network device, the logical channel group comprising at least one logical channel in the UE; and store the channel identifiers of the each logical channel in the logical channel group and the buffer state report trigger mode corresponding to the logical channel group to the trigger mode relationship table;

wherein the buffer state report trigger mode corresponding to the logical channel group in which the logical channel is included is acquired by:

acquire the buffer state report trigger mode corresponding to the logical channel from the trigger mode relationship table based on the channel identifier of the logical channel.

In some embodiments, wherein the receive a buffer state report trigger mode corresponding to a logical channel group sent by the access network device comprises:

receive a Radio Resource Control (RRC) message sent by the access network device, the RRC message comprising the channel identifiers of the each logical channel in the logical channel group and the buffer state report trigger mode corresponding to the logical channel group.

In some embodiments, wherein the send buffer state corresponding to the logical channel to an access network device based on the buffer state report trigger mode comprises:

if the buffer state report trigger mode is a mode that the buffer state report is triggered when new data arrives, send the buffer state of the logical channel to the access network device when the UE buffers service data to a buffer space corresponding to the logical channel;

if the buffer state report trigger mode is a mode that the buffer state report is triggered when a buffer data amount reaches a predetermined threshold, send the buffer state of the logical channel to the access network device when a service data amount buffered in a buffer space corresponding to the logical channel reaches a predetermined threshold; or if the buffer state report trigger mode is a mode that the buffer state report is triggered when a high priority is assigned, acquire service priorities of various services to be sent by the UE, and sending the buffer state of the logical channel to the access network device if a service priority corresponding to the service data is the highest one of the acquired service priorities of the various services.

In a sixth aspect, an apparatus for sending buffer state is provided. The apparatus including:

a processor; and a memory for storing instructions executable by the processor;

wherein the processor is configured to perform following instructions:

determine a buffer state report trigger mode corresponding to a logical channel group, the logical channel group comprising at least one logical channel of a user equipment (UE); and send a radio resource control (RRC) message to the UE, the RRC message comprising a buffer state report trigger mode corresponding to the logical channel group and channel identifiers of each logical channel in the logical channel group, and the RRC message being configured to send, by the UE, the buffer state of the logical channel of the UE.

In a seventh aspect, a computer storage medium is provided. The computer storage medium including:

an instruction for determining a logical channel for transmitting service data in a user equipment (UE);

an instruction for acquiring a buffer state report trigger mode corresponding to the logical channel based on a trigger mode relationship table, the trigger mode relationship table comprising logical channels in the UE and buffer state report trigger modes corresponding to the logical channels; and an instruction for sending the buffer state corresponding to the logical channel to an access network device based on the buffer state report trigger mode.

In an eighth aspect, a computer storage medium is provided. The computer storage medium including:

an instruction for determining a buffer state report trigger mode corresponding to a logical channel group, the logical channel group comprising at least one logical channel of a user equipment (UE); and an instruction for sending a radio resource control (RRC) message to the UE, the RRC message comprising a buffer state report trigger mode corresponding to the logical channel group and channel identifiers of each logical channel in the logical channel group, and the RRC message being configured to send, by the UE, the buffer state of the logical channel of the UE.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure will be described in further detail with reference to the accompanying drawings, to present the objects, technical solutions, and advantages of the present disclosure more clearly.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

The base station typically configures in advance a report period in the UE. Within each report period, the UE acquires buffer states of a logical channel over which service data is to be sent. The service data may be buffered in a buffer space corresponding to the logical channel. If within the current report period, the UE has sent buffer state of other logical channels to the base station within the current report period, the UE sends the buffer state of the logical channel to the base station within a next report period; otherwise, the UE sends the buffer state of the logical channel to the base station within the current report period, such that the base station dynamically allocate a network resource based on the buffer state, and then sends service data buffered in the buffer space corresponding to the logical channel.

Figure 1:
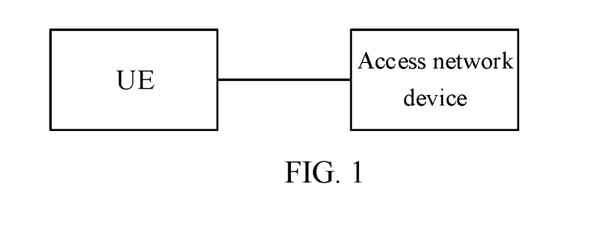
FIG. 1 is a schematic diagram of network architecture according to an embodiment of the present disclosure.

FIG. 1 is a schematic diagram of network architectures according to an embodiment of the present disclosure. The network architecture may be applied to an LTE or 5G or the like communication systems, and includes:

a UE and an access network device, wherein a connection may be established between the UE and the access network device. The UE may be a mobile phone, a tablet computer or the like; and the access network device may be a base station, an evolved Node B (eNB), a radio-access network (RAN) or the like.

Before the UE sends service data of a service to the access network device or before the access network device sends service data of a service to the UE, the access network device may configure at least one logical channel for transmitting the service data based on service information of the service. The service information may be a service type, a delay, a sending frequency, a priority, a sending frequency and the like information. In the UE, each logical channel corresponds to a buffer space, wherein the buffer space corresponding to the logical channel is used for buffering the service data transmitted over the logical channel.

The access network may also configure a buffer state report trigger mode corresponding to the at least one logical channel based on the service information of the service, and send the buffer state report trigger mode corresponding to the at least one logical channel to the UE. The buffer state report trigger mode is used for triggering the UE to send buffer state of a logical channel to the access network device. The buffer state of the logical channel may be status of a buffer space corresponding to the logical channel.

The buffer state of the logical channel may be service data amount and the like information buffered in the buffer space corresponding to the logical channel.

For example, the buffer state report trigger mode of the logical channel may include: triggering buffer state report when new data arrives, triggering buffer state report when a buffer data amount reaches a predetermined threshold and triggering buffer state report when a high priority is assigned and the like.

The implementation of triggering buffer state report when new data arrives refers to triggering the UE to send the buffer state of the logical channel to the access network device when the UE buffers to-be-sent service data to the buffer space corresponding to the logical channel. With respect to service data imposing a strict requirement on delay, the access network device may configure the buffer state report trigger mode for the logical channel for transmitting the service data as triggering buffer state report when new data arrives, based on the service information of the service corresponding to the service data.

The implementation of triggering buffer state report when a buffer data amount reaches a predetermined threshold refers to triggering the UE to send the buffer state of the logical channel when the data amount buffered by the UE to the buffer space corresponding to the logical channel. With respect to service data imposing a non-strict requirement on delay, the access network device may configure the buffer state report trigger mode for the logical channel for transmitting the service data as triggering buffer state report a buffer data amount reaches a predetermined threshold, based on the service information of the service corresponding to the service data.

The implementation of triggering buffer state report when a high priority is assigned refers to triggering the UE to send the buffer state of the logical channel when the service priority corresponding to the service data is highest in the service priorities corresponding to all the service data to be sent by the UE. With respect to service data imposing a strict requirement on transmission quality, the access network device may configure the buffer state report trigger mode for the logical channel for transmitting the service data as triggering buffer state report when a high priority is assigned, based on the service information of the service corresponding to the service data.

The UE is configured to: receive buffer state corresponding to at least one logical channel sent by the access network device, and determine a logical channel over which service data is to be transmitted; acquire a buffer state report trigger mode corresponding to the logical channel; and send the buffer state of the logical channel to the access network device based on the buffer state report trigger mode.

Figure 2A:
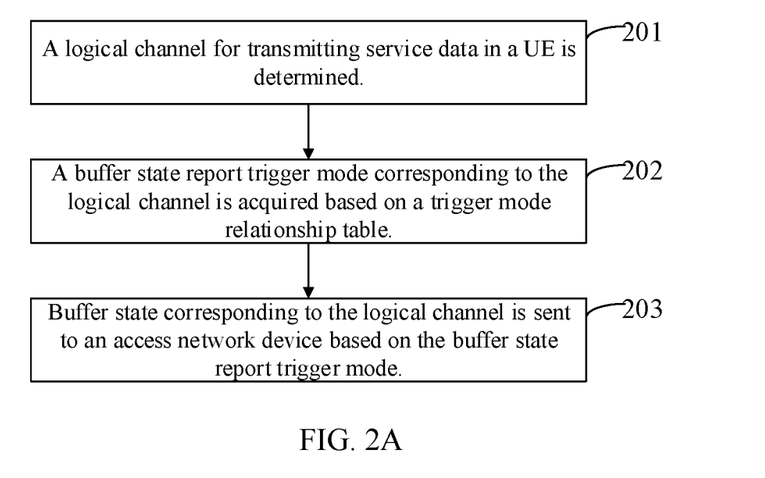
FIG. 2A is a schematic flowchart of a method for sending buffer state according to an embodiment of the present disclosure.

Referring to FIG. 2A, an embodiment of the present disclosure provides a method for sending buffer state. The method may be performed by the UE in the network architecture as illustrated in FIG. 1, and the method includes the following steps:

In step 201, a logical channel for transmitting service data in a UE is determined.

In step 202, a buffer state report trigger mode corresponding to the logical channel is acquired based on a trigger mode relationship table, wherein the trigger mode relationship table includes logical channels in the UE and buffer state report trigger modes corresponding to the logical channels.

In step 203, buffer state corresponding to the logical channel is sent to an access network device based on the buffer state report trigger mode.

Figure 2B:
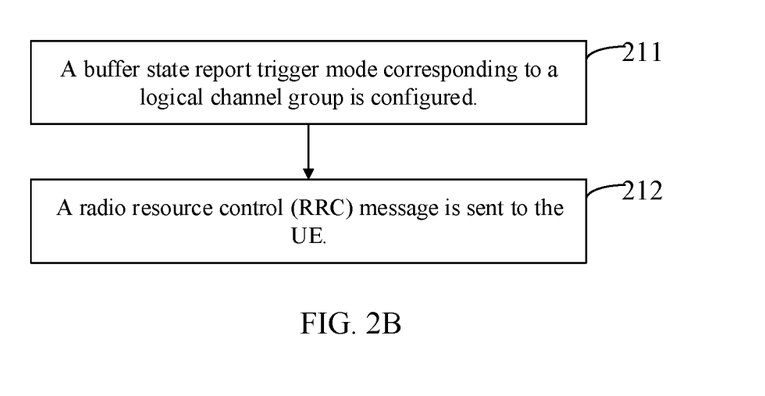
FIG. 2B is a schematic flowchart of another method for sending buffer state according to an embodiment of the present disclosure.

Referring to FIG. 2B, an embodiment of the present disclosure provides another method for sending buffer state. The method may be performed by the access network device in the network architecture as illustrated in FIG. 1, and the method includes the following steps:

In step 211, a buffer state report trigger mode corresponding to a logical channel group is configured, wherein the logical channel group includes at least one logical channel in a UE.

In step 212, a radio resource control (RRC) message is sent to the UE, wherein the RRC message includes a buffer state report trigger mode corresponding to the logical channel group and channel identifiers of logical channels in the logical channel group, and the RRC message is used for sending buffer state of the logical channel in the UE by the UE.

In this embodiment of the present disclosure, the access network device configures a buffer state report trigger mode for each logical channel in the UE. In this way, each logical channel in the UE has a corresponding buffer state report trigger mode; and when sending the buffer state of the logical channel, the UE may send the buffer state of the logical channel to a base station based on the buffer state report trigger mode corresponding to the logical channel. As such, special requirements on bearing services over different logical channels are accommodated.

Figure 3:
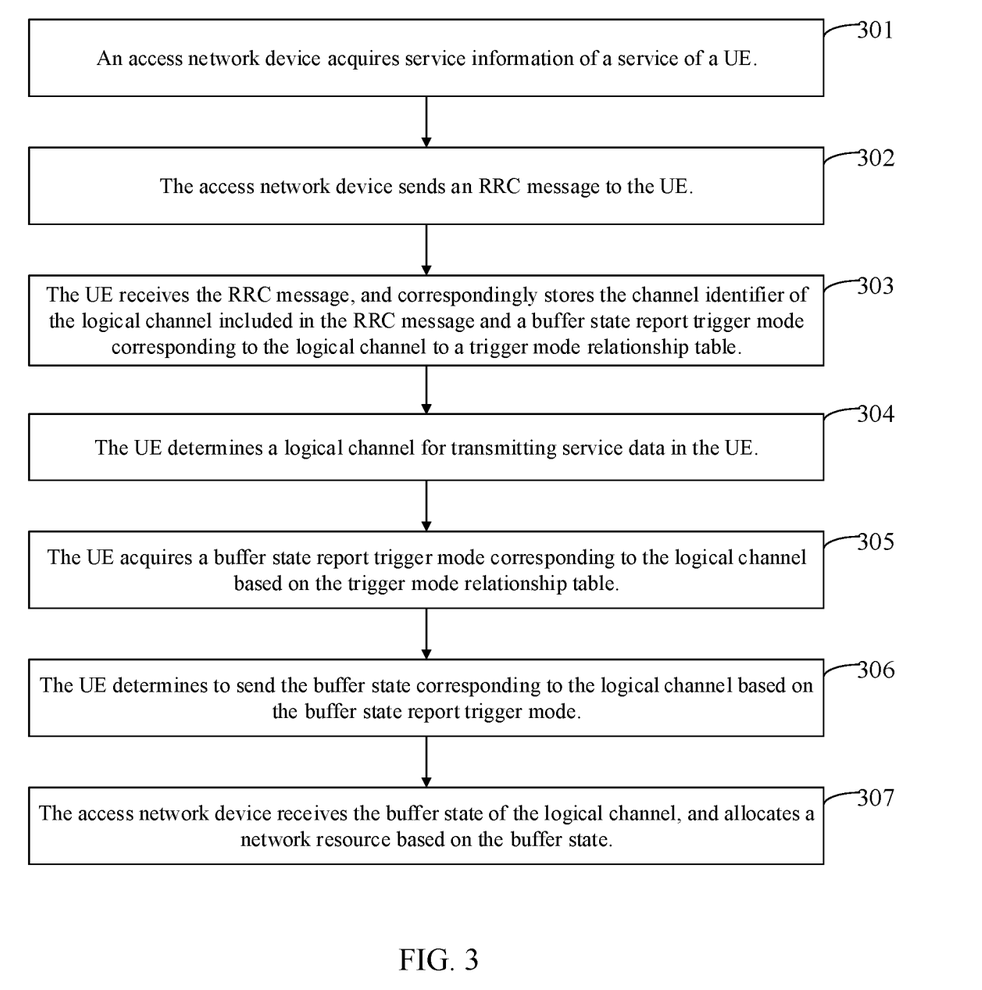
FIG. 3 is a schematic flowchart of still another method for sending buffer state according to an embodiment of the present disclosure.

Referring to FIG. 3, an embodiment of the present disclosure provides still another method for sending buffer state. The method may be applied to the network architecture as illustrated in FIG. 1, and the method includes the following steps:

In step 301, an access network device acquires service information of a service of a UE, and configures a buffer state report trigger mode corresponding to a logical channel group, wherein the logical channel group includes at least one logical channel for transmitting service data of the service.

The service information may include a service type, a delay, a sending frequency, a priority and the like. Before the UE needs to send service data to the access network device, the UE may send service information of a service to the access network device, and the access network device receives the service information of the service; or when the access network device needs to sent service data to the UE, the access network device may directly acquire service information of a service.

After acquiring the service information of the service, the access network device may configure at least one logical channel for transmitting the service data of the service in the UE, that is, a logical channel group is acquired, and then configure a buffer state report trigger mode corresponding to the logical channel group based on the service information of the service.

The operation of configuring the buffer state report trigger mode corresponding to the logical channel group may be as follows:

If it is determined based on the service information of the service that the service imposes a high requirement on delay, for example, the delay included in the service information is less than a predetermined delay threshold, the buffer state report trigger mode corresponding to the logical channel group may be configured as triggering buffer state report when new data arrives.

If it is determined based on the service information of the service that the service imposes a low requirement on delay, for example, the delay included in the service information is greater than or equal to a predetermined delay threshold, the buffer state report trigger mode corresponding to the logical channel group may be configured as triggering buffer state report when a buffer data amount reaches a predetermined threshold.

If it is determined based on the service information of the service that the service imposes a high requirement on transmission quality, for example, the priority included in the service information greater than a predetermined priority threshold, the buffer state report trigger mode corresponding to the logical channel group may be configured as triggering buffer state report when a high priority is designated.

In step 302, the access network device sends an RRC message to the UE, wherein the RRC message includes channel identifiers of logical channels in the logical channel group and the buffer state report trigger mode corresponding to the logical channel group.

In some embodiments, if the access network device further instructs the UE to periodically send buffer state of a logical channel, the RRC message may further include an instruction message, wherein the instruction message is used for instructing the UE to periodically send the buffer state of the logical channel.

In some embodiments, the access network device may further configure a logical channel which does not support buffer state report; and the access network device may also notify a channel identifier of the logical channel which does not support buffer state report to the UE via an RRC message, that is, the RRC message may include the channel identifier of the logical channel which does not support buffer state report.

In step 303, the UE receives the RRC message, and correspondingly stores the channel identifier of the logical channel included in the RRC message and a buffer state report trigger mode corresponding to the logical channel to a trigger mode relationship table.

The trigger mode relationship table is used for storing corresponding relationships between channel identifiers of logical channels and buffer state report trigger modes thereof.

This step may be as follows: The UE receives the RRC message, extracts channel identifiers of logical channels included in a logical channel group and a buffer state report trigger mode corresponding to the logical channel group from the RRC message, and correspondingly stores the extracted channel identifiers of the logical channels and the extracted buffer state report trigger mode to the trigger mode relationship table.

It should be noted that after the access network device configures a logical channel for the UE, the logical channel corresponds to a buffer space in the UE, and the buffer space is used for buffering service data of a service to be sent by the UE over the logical channel. That is, before the UE sends service data of a service over the logical channel, the service data of the service is firstly buffered in the buffer space corresponding to the logical channel, and then the service buffered in the buffer space is sent over the logical channel.

It should be further noted that when the UE needs to send service data of a service, the UE may determine a logical channel for transmitting the service data of the service, and buffer the service data of the service to the buffer space corresponding to the logical channel. In this case, the logical channel may be referred to as a logical channel for transmitting service data, and then the UE may send the service data by the following steps.

In step 304, the UE determines a logical channel for transmitting service data in the UE is determined.

The UE may determine the logical channel corresponding to the buffer space in which the service data is buffered as the logical channel for transmitting service data in the UE.

In step 305, the UE acquires a buffer state report trigger mode corresponding to the logical channel based on the trigger mode relationship table.

This step may be as follows: The UE acquires the channel identifier of the logical channel, and acquires the buffer state report trigger mode corresponding to the logical channel from the trigger mode relationship table based on the channel identifier of the logical channel.

In step 306, the UE determines to send the buffer state corresponding to the logical channel based on the buffer state report trigger mode.

In some embodiments, if the buffer state report trigger mode is triggering buffer state report when new data arrives, the UE sends the buffer state of the logical channel to the access network device when the UE buffers to-be-sent service data to a buffer space corresponding to the logical channel.

In some embodiments, if the buffer state report trigger mode is triggering buffer state report when a buffer data amount reaches a predetermined threshold, the UE detects whether a service data amount buffered to a buffer space corresponding to the logical channel reaches a predetermined threshold, and sends the buffer state of the logical channel to the access network device if the service data amount reaches the predetermined threshold.

In some embodiments, if the buffer state report trigger mode is triggering buffer state report when a high priority is assigned, the UE acquires service priorities of various services that need to be sent by the UE currently, and sends the buffer state of the logical channel to the access network device if a service priority corresponding to the service data is the highest one of the acquired service priorities of the various services.

The buffer state of the logical channel is essentially status of the buffer space corresponding to the logical channel, and may be the service data amount or the like information buffered in the buffer space corresponding to the logical channel.

In step 307, the access network device receives the buffer state of the logical channel, and allocates a network resource based on the buffer state.

The access network device receives the buffer state of the logical channel, and allocates the network resource based on the service data amount and the like information included in the buffer state, wherein the network resource may be a bandwidth resource, a network interface or the like.

After allocating the network resource, the access network device sends a notification to the UE. Afterwards, the UE may send the service data of the service to the access network device over the logical channel.

In some embodiments, if the logical channel is configured to not support buffer state report, that is, the channel identifier of the logical channel is the same as the identifier channel of the logical channel which does not support buffer state report, the UE may not be triggered to send the buffer state of the logical channel.

In some embodiments, if the buffer state of the logical channel is sent, the UE may cancel sending of the buffer state of the logical channel to the access network device.

In this embodiment of the present disclosure, the access network device configures a buffer state report trigger mode for each logical channel in the UE. In this way, each logical channel in the UE has a corresponding buffer state report trigger mode; and when sending the buffer state of the logical channel, the UE may send the buffer state of the logical channel to a base station based on the buffer state report trigger mode corresponding to the logical channel. For example, with respect to a service imposing a high requirement on delay, the buffer state report trigger mode of the logical channel for sending the service may be configured as triggering buffer state report when new data arrives. In this way, when the UE buffers service data in a buffer space corresponding to the logical channel, the UE sends the buffer state of the logical channel to the base station to accommodate the delay requirement imposed by the service. Therefore, according to this embodiment of the present disclosure, special requirements on bearing services over different logical channels may be accommodated.

Hereinafter apparatus embodiments according to the present disclosure are described, and apparatuses in the embodiments hereinafter may be used for practicing the method embodiments. Details that are not disclosed in the apparatus embodiments may be referenced to the method embodiments.

Figure 4A:
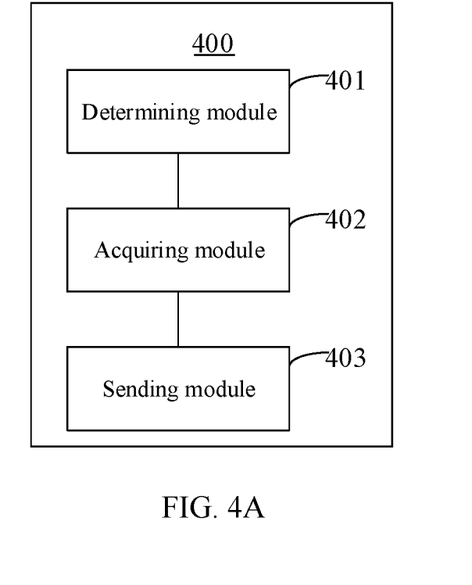
FIG. 4A is a schematic structural diagram of an apparatus for sending buffer state according to an embodiment of the present disclosure.

Referring to FIG. 4A, an embodiment of the present disclosure provides an apparatus 400 for sending buffer state. The apparatus 400 may be the UE or a part of the UE in the embodiment as illustrated in FIG. 1, and the apparatus 400 includes:

a determining module 402, configured to determine a logical channel for transmitting service data in a user equipment (UE);

an acquiring module 402, configured to acquire a buffer state report trigger mode corresponding to the logical channel based on a trigger mode relationship table, the trigger mode relationship table including logical channels in the UE and buffer state report trigger modes corresponding to the logical channels; and a sending module 403, configured to send buffer state corresponding to the logical channel to an access network device based on the buffer state report trigger mode.

The various device components, units, blocks, or portions may have modular configurations, or are composed of discrete components, but nonetheless can be referred to as "modules" in general. In other words, the "components," "modules" or "units" referred to herein may or may not be in modular forms.

Figure 4B:
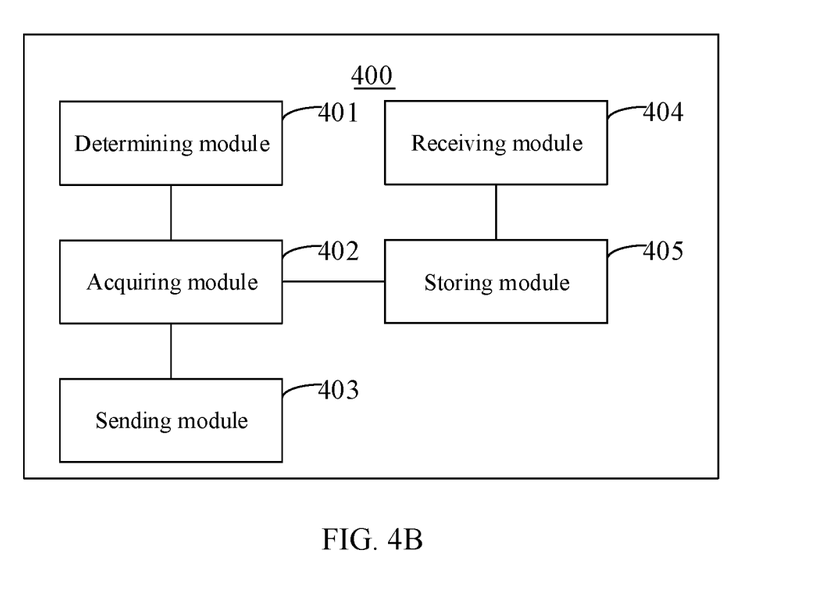
FIG. 4B is a schematic structural diagram of another apparatus for sending buffer state according to an embodiment of the present disclosure.

In some embodiments, referring to FIG. 4B, the apparatus 400 further includes:

a receiving module 404, configured to receive a buffer state report trigger mode corresponding to a logical channel group and channel identifiers of logical channels in the logical channel group sent by the access network device, the logical channel group including at least one logical channel in the UE; and a storing module 45, configured to store the channel identifiers of the logical channels in the logical channel group and the buffer state report trigger mode corresponding to the logical channel group to the trigger mode relationship table;

wherein the acquiring module 402 is further configured to acquire the buffer state report trigger mode corresponding to the logical channel from the trigger mode relationship table based on the channel identifier of the logical channel.

In some embodiments, the receiving module 404 is further configured to receive an RRC message sent by the access network device, wherein the RRC message includes the channel identifiers of the logical channels in the logical channel group and the buffer state report trigger mode corresponding to the logical channel group.

In some embodiments, the sending module 402 is configured to:

if the buffer state report trigger mode is triggering buffer state report when new data arrives, send the buffer state of the logical channel to the access network device when the UE buffers service data to a buffer space corresponding to the logical channel;

if the buffer state report trigger mode is triggering buffer state report when a buffer data amount reaches a predetermined threshold, send the buffer state of the logical channel to the access network device when a service data amount buffered in a buffer space corresponding to the logical channel reaches a predetermined threshold; or if the buffer state report trigger mode is triggering buffer state report when a high priority is assigned, acquire service priorities of various services that need to be sent by the UE currently, and send the buffer state of the logical channel to the access network device if a service priority corresponding to the service data is the highest one of the acquired service priorities of the various services.

In these embodiments of the present disclosure, a logical channel for transmitting service data in a UE determined; and a buffer state report trigger mode corresponding to the logical channel is acquired based on a trigger mode relationship table. Since the trigger mode relationship table includes logical channels in the UE and buffer state report trigger modes corresponding to the logical channels, buffer state of different logical channels may be sent to an access network device in different buffer state report trigger modes.

Figure 5:
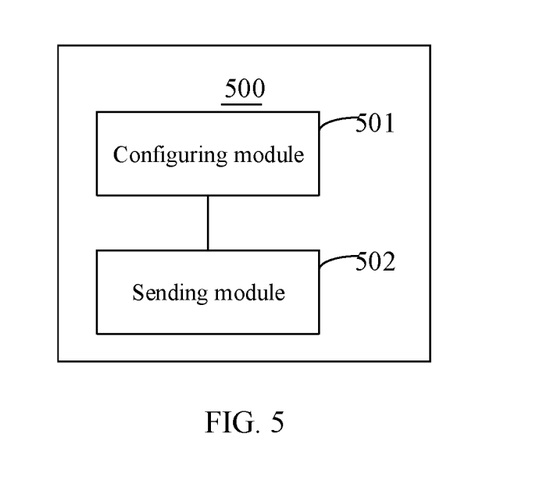
FIG. 5 is a schematic structural diagram of still another apparatus for sending buffer state according to an embodiment of the present disclosure.

Referring to FIG. 5, an embodiment of the present disclosure provides an apparatus 500 for sending buffer state. The apparatus 500 may be the access network device or a part of the access network device in the embodiment as illustrated in FIG. 1, and the apparatus 500 includes:

a configuring module 501, configured to configure a buffer state report trigger mode corresponding to a logical channel group, the logical channel group including at least one logical channel in a user equipment (UE); and a sending module 502, configured to send a radio resource control (RRC) message to the UE, the RRC message including a buffer state report trigger mode corresponding to the logical channel group and channel identifiers of logical channels in the logical channel group, and the RRC message being used for sending buffer state of the logical channel in the UE by the UE.

In this embodiment of the present disclosure, a buffer state report trigger mode corresponding to a logical channel in the UE may is configured by a configuring module, such that buffer state of different logical channels may be sent to an access network device in different buffer state report trigger modes.

With respect to the apparatus in the above embodiment, details about performing corresponding operations by different modules have been described in the method embodiments, which are not given herein any further.

Figure 6:
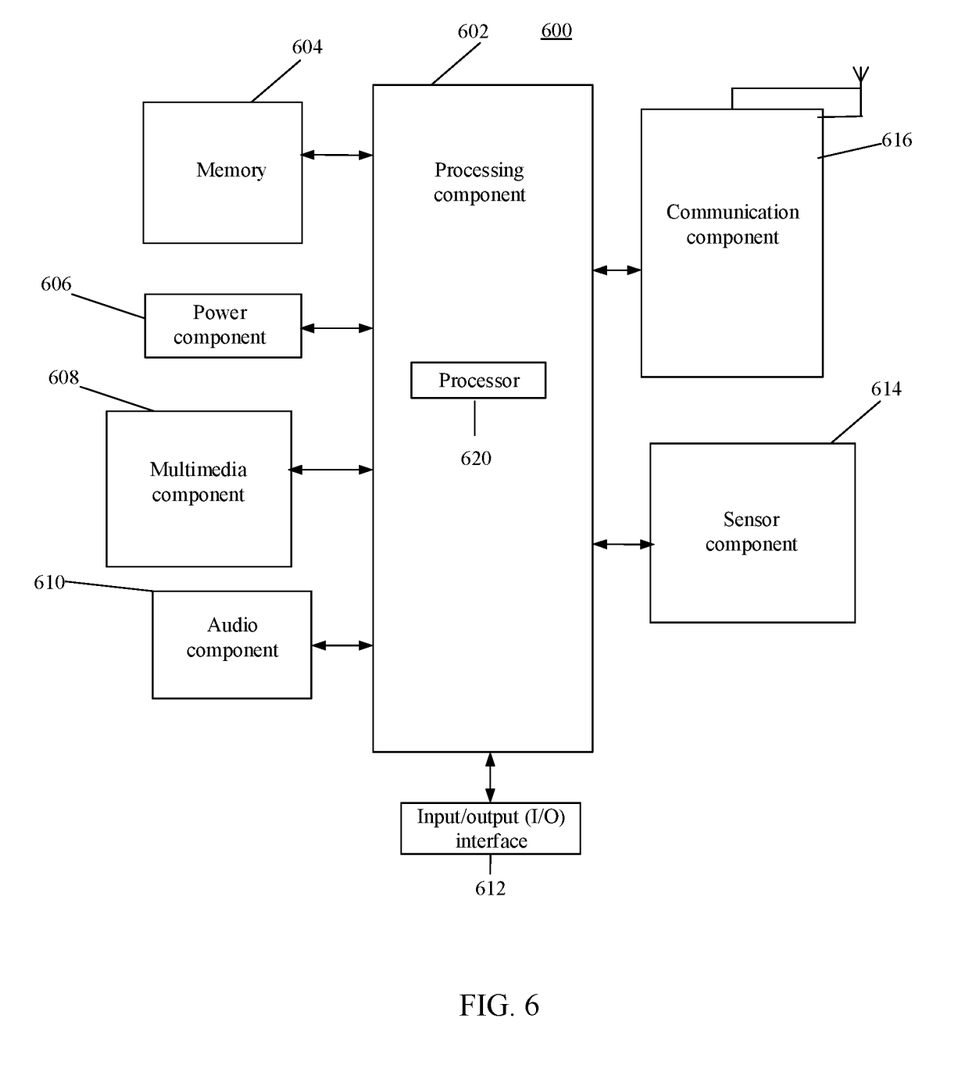
FIG. 6 is a schematic structural diagram of yet still another apparatus for sending buffer state according to an embodiment of the present disclosure.

FIG. 6 is a schematic block diagram of an apparatus 600 for sending buffer state according to an exemplary embodiment. For example, the apparatus 600 may be the UE in the embodiment as illustrated in FIG. 1. The UE may be a mobile phone, a computer, a digital broadcasting terminal, a message transceiver device, a gaming console, a tablet device, medical equipment, fitness equipment, personal digital assistant or the like.

As illustrated in FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 may include at least one processor 620 to execute instructions for performing all or a part of the steps in the above method. In addition, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operations of the apparatus 600. Examples of such data include instructions for any application or method operated on the apparatus 600, contact data, phonebook data, messages, pictures, videos and the like. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 606 provides power to various components of the apparatus 600. The power component 606 may include a power management system, one or more power supplies, and other components associated with the generation, management, and distribution of power in the apparatus 600.

The multimedia component 608 includes a screen providing an output interface between the apparatus 600 and a user. In some embodiments, the screen may include a liquid crystal display (LCD) and a touch panel (TP). In some embodiments, the screen can be other types of displays, such as organic light-emitting diode (OLED) displays.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive external multimedia data when the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, or a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and a peripheral interface module, such as a keyboard, a click wheel, a button or the like. The buttons may include, but not limited to, a home button, a volume button, a starting button, and a locking button.

The sensor component 614 includes one or more sensors to provide status assessments of various aspects of the apparatus 600. For example, the sensor component 614 may detect an open/closed status of the apparatus 600, relative positioning of components, e.g., the display and the keypad, of the apparatus 600, a change in position of the apparatus 600 or a component of the apparatus 600, a presence or absence of user in contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate wired or wireless communications between the apparatus 600 and other devices. The apparatus 600 may access a wireless network based on a communication standard, such as Wi-Fi, 2G, 3G, 4G, 5G, or a combination thereof. In one exemplary embodiment, the communication component 616 receives a broadcast signal or broadcast associated information from an external broadcast management system over a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

An exemplary embodiment further provides a non-transitory computer-readable storage medium storing instructions, for example, the memory 604 including instructions. The instructions, when being executed by the processor 620 of the apparatus 600, may cause the processor 620 to perform the above methods. For example, the non-transitory computer-readable storage medium may be a read-only memory (ROM), a random-access memory (RAM), a compact disc ROM (CD-ROM), a magnetic tape, a floppy disk, an optical data storage device or the like.

A non-transitory computer-readable storage medium is further provided, wherein instructions in the storage medium, when being executed by the processor of the apparatus 600, may cause the apparatus to perform a method for sending buffer state. The method includes:

determining a logical channel for transmitting service data in a user equipment (UE);

acquiring a buffer state report trigger mode corresponding to the logical channel based on a trigger mode relationship table, the trigger mode relationship table including logical channels in the UE and buffer state report trigger modes corresponding to the logical channels; and sending buffer state corresponding to the logical channel to an access network device based on the buffer state report trigger mode.

In some embodiments, the method further includes:

receiving a buffer state report trigger mode corresponding to a logical channel group and channel identifiers of logical channels in the logical channel group sent by the access network device, the logical channel group including at least one logical channel in the UE; and storing the channel identifiers of the logical channels in the logical channel group and the buffer state report trigger mode corresponding to the logical channel group to the trigger mode relationship table;

wherein the buffer state report trigger mode corresponding to the logical channel group where the logical channel is located is acquired by:

acquiring the buffer state report trigger mode corresponding to the logical channel from the trigger mode relationship table based on the channel identifier of the logical channel.

In some embodiments, the receiving a buffer state report trigger mode corresponding to a logical channel group sent by the access network device includes:

receiving an RRC message sent by the access network device, the RRC message including the channel identifiers of the logical channels in the logical channel group and the buffer state report trigger mode corresponding to the logical channel group.

In some embodiments, the sending buffer state corresponding to the logical channel to an access network device based on the buffer state report trigger mode includes:

if the buffer state report trigger mode is triggering buffer state report when new data arrives, sending the buffer state of the logical channel to the access network device when the UE buffers service data to a buffer space corresponding to the logical channel;

if the buffer state report trigger mode is triggering buffer state report when a buffer data amount reaches a predetermined threshold, sending the buffer state of the logical channel to the access network device when a service data amount buffered in a buffer space corresponding to the logical channel reaches a predetermined threshold; or if the buffer state report trigger mode is triggering buffer state report when a high priority is assigned, acquiring service priorities of various services that need to be sent by the UE currently, and sending the buffer state of the logical channel to the access network device if a service priority corresponding to the service data is the highest one of the acquired service priorities of the various services.

Figure 7:
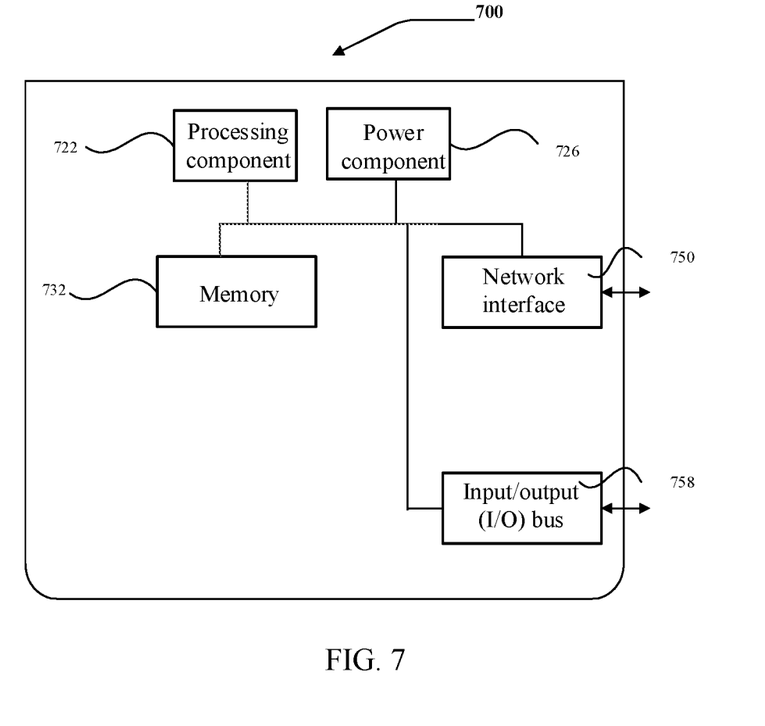
FIG. 7 is a schematic structural diagram of yet still another apparatus for sending buffer state according to an embodiment of the present disclosure.

FIG. 7 is a schematic block diagram of an apparatus 700 for sending buffer state according to an exemplary embodiment. For example, the apparatus 700 may be provided as a server. Referring to FIG. 7, the apparatus 700 includes a processing component 722, and further includes at least one processor and a memory resource represented by a memory 732, configured to store instructions that are executable by the processing component 722, for example, applications. The application stored in the memory 732 may include at least one module each corresponding to a group of instructions. In addition, the processing component 722 is configured to execute the instructions to perform the method for sending buffer state.

The apparatus 700 may include: a power component 726 configured to perform power management for the apparatus 700; a wired or wireless network interface 750 configured to connect the apparatus 700 to the network; and an input/output (I/O) bus 758. The apparatus 700 may run an operating system stored in the memory 732, for example, Windows Server™, Mac OS X™, Unix™, Linux™, FreeBSD™ or the like.

Those of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

Various embodiments of the present disclosure can have one or more the following advantages.

A logical channel for transmitting service data in a UE can be determined; and a buffer state report trigger mode corresponding to the logical channel can be acquired based on a trigger mode relationship table. Because the trigger mode relationship table includes logical channels in the UE and buffer state report trigger modes corresponding to the logical channels, buffer state of different logical channels may be sent to an access network device in different buffer state report trigger modes.

In the present disclosure, it is to be understood that the terms "lower," "upper," "front," "back," "left," "right," "top," "bottom," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for sending buffer state, comprising:

determining a logical channel of user equipment (UE) for transmitting service data;

acquiring a buffer state report trigger mode corresponding to the logical channel based on a trigger mode relationship table, the trigger mode relationship table comprising logical channels in the UE and buffer state report trigger modes corresponding to logical channels;

sending the buffer state corresponding to the determined logical channel to an access network device based on the buffer state report trigger mode;

receiving a buffer state report trigger mode corresponding to a logical channel group and channel identifiers of each logical channel in the logical channel group sent by the access network device, the logical channel group comprising at least one logical channel in the UE; and storing the channel identifiers of the each logical channel in the logical channel group and the buffer state report trigger mode corresponding to the logical channel group to the trigger mode relationship table, wherein the buffer state report trigger mode corresponding to the logical channel group in which the logical channel is included is acquired by:

acquiring the buffer state report trigger mode corresponding to the logical channel from the trigger mode relationship table based on the channel identifier of the logical channel.

2. The method according to claim 1, wherein the receiving a buffer state report trigger mode corresponding to a logical channel group sent by the access network device comprises:

receiving a Radio Resource Control (RRC) message sent by the access network device, the RRC message comprising the channel identifiers of the each logical channel in the logical channel group and the buffer state report trigger mode corresponding to the logical channel group.

3. The method according to claim 1, wherein the sending buffer state corresponding to the logical channel to an access network device based on the buffer state report trigger mode comprises:

if the buffer state report trigger mode is a mode that the buffer state report is triggered when new data arrives, sending the buffer state of the logical channel to the access network device when the UE buffers service data to a buffer space corresponding to the logical channel;

if the buffer state report trigger mode is a mode that the buffer state report is triggered when a buffer data amount reaches a predetermined threshold, sending the buffer state of the logical channel to the access network device when a service data amount buffered in a buffer space corresponding to the logical channel reaches a predetermined threshold; or if the buffer state report trigger mode is a mode that the buffer state report is triggered when a high priority is assigned, acquiring service priorities of various services to be sent by the UE, and sending the buffer state of the logical channel to the access network device if a service priority corresponding to the service data is the highest one of the acquired service priorities of the various services.

4. A communication system comprising user equipment (UE), wherein the UE is configured to:
receive a buffer state corresponding to at least one logical channel sent by an access network device, and determine a logical channel over which service data is to be transmitted;
acquire a buffer state report trigger mode corresponding to the logical channel based on a trigger mode relationship table comprising logical channels in the UE and buffer state report trigger modes corresponding to logical channels; and
send the buffer state of the determined logical channel to the access network device based on the buffer state report trigger mode;
wherein:
the system further comprises the access-network device, wherein buffer states of a plurality of different logical channels are sent to the access network device in different buffer state report trigger modes,
the UE comprises at least one of a mobile phone or a tablet computer, and the access network device comprises at least one of a base station, an evolved Node B (eNB), or a radio access network (RAN), and
prior to the UE sending the service data of a service to the access network device or prior to the access network device sending the service data of the service to the UE, the access network device is configured to have the plurality of different logical channels for transmitting the service data based on service information of the service.

5. The system of claim 4, wherein the service information comprises at least one of a service type, a delay, a sending frequency, a priority, or a sending frequency.

6. The system of claim 5, wherein for the UE each logical channel corresponds to a buffer space, and the buffer space corresponding to the logical channel is used for buffering the service data transmitted over the logical channel.

7. The system of claim 6, wherein the access network is configured to establish a buffer state report trigger mode corresponding to at least one of the plurality of different logical channels based on the service information of the service, and send the buffer state report trigger mode corresponding to the at least one of the plurality of different logical channels to the UE.

8. The system of claim 7, wherein the buffer states of the plurality of different logical channels comprise at least one of a status of the buffer space corresponding to the each logical channel, or information on service data amount buffered in the buffer space corresponding to the each logical channel.

9. The system of claim 8, wherein the buffer state report trigger mode of the each logical channel comprises at least one of: triggering buffer state report upon new data arriving, triggering buffer state report upon the service data amount reaching a predetermined threshold; or triggering buffer state report when a high priority is assigned.

10. The system of claim 9, wherein the triggering buffer state report upon new data arriving comprises triggering the UE to send the buffer state of the logical channel to the access network device upon the UE buffering to-be-sent service data to the buffer space corresponding to the logical channel; and wherein the service data impose a strict requirement on delay.

11. The system of claim 9, wherein the triggering buffer state report upon the buffer data amount reaching a predetermined threshold comprises triggering the UE to send the buffer state of the logical channel upon the data amount buffered by the UE to the buffer space corresponding to the logical channel; and wherein the service data impose a non-strict requirement on delay.

12. The system of claim 9, wherein the triggering buffer state report upon a high priority is assigned comprises triggering the UE to send the buffer state of the logical channel upon the service priority corresponding to the service data being highest among service priorities corresponding to all the service data to be sent by the UE, and wherein the service data impose a strict requirement on transmission quality.

13. An apparatus for sending buffer state, comprising:
a processor; and
a memory for storing instructions executable by the processor;
wherein the processor is configured to execute the instructions to perform operations including:
determining a logical channel for transmitting service data in user equipment (UE);
acquiring a buffer state report trigger mode corresponding to the logical channel based on a trigger mode relationship table, the trigger mode relationship table comprising logical channels in the UE and buffer state report trigger modes corresponding to logical channels;
sending the buffer state corresponding to the determined logical channel to an access network device based on the buffer state report trigger mode; and
receiving a buffer state report trigger mode corresponding to a logical channel group and channel identifiers of each logical channel in the logical channel group sent by the access network device, the logical channel group comprising at least one logical channel in the UE; and
storing the channel identifiers of the each logical channel in the logical channel group and the buffer state report trigger mode corresponding to the logical channel group to the trigger mode relationship table,
wherein the buffer state report trigger mode corresponding to the logical channel group in which the logical channel is included is acquired by:
acquiring the buffer state report trigger mode corresponding to the logical channel from the trigger mode relationship table based on the channel identifier of the logical channel.

14. The apparatus according to claim 13, wherein the receiving a buffer state report trigger mode corresponding to a logical channel group sent by the access network device comprises:
receiving a Radio Resource Control (RRC) message sent by the access network device, the RRC message comprising the channel identifiers of the each logical channel in the logical channel group and the buffer state report trigger mode corresponding to the logical channel group.

15. The apparatus according to claim 13, wherein the sending buffer state corresponding to the logical channel to an access network device based on the buffer state report trigger mode comprises:
in a case that the buffer state report trigger mode is a mode that the buffer state report is triggered when new data arrives, send the buffer state of the logical channel to the access network device when the UE buffers service data to a buffer space corresponding to the logical channel;
in a case that the buffer state report trigger mode is a mode that the buffer state report is triggered when a buffer data amount reaches a predetermined threshold, send the buffer state of the logical channel to the access network device when a service data amount buffered in a buffer space corresponding to the logical channel reaches a predetermined threshold; or in a case that the buffer state report trigger mode is a mode that the buffer state report is triggered when a high priority is assigned, acquire service priorities of various services to be sent by the UE, and sending the buffer state of the logical channel to the access network device if a service priority corresponding to the service data is the highest one of the acquired service priorities of the various services.

* * * * *